(12) United States Patent
Ufheil et al.

(10) Patent No.: US 6,834,779 B2
(45) Date of Patent: Dec. 28, 2004

(54) DISPENSING CANISTER

(75) Inventors: Gerhard Ufheil, New Milford, CT (US); Juan J. Gonzalez, New Milford, CT (US); Francesco Chiarella, Hyde Park, NY (US); Constance L. Whippie, New Milford, CT (US); Dinakar Panyam, New Milford, CT (US)

(73) Assignee: Nestec S.A., Vevey (CH)

( * ) Notice: Subject to any disclaimer, the term of this patent is extended or adjusted under 35 U.S.C. 154(b) by 312 days.

(21) Appl. No.: 10/183,861

(22) Filed: Jun. 25, 2002

(65) Prior Publication Data

US 2003/0234261 A1 Dec. 25, 2003

(51) Int. Cl.[7] .............................................. G01F 11/000
(52) U.S. Cl. ........................... 222/232; 222/413; 222/1
(58) Field of Search ................................. 222/198, 220, 222/201, 227, 202, 413, 232, 236–241, 231

(56) References Cited

U.S. PATENT DOCUMENTS

| | | | | |
|---|---|---|---|---|
| 1,872,028 A | * | 8/1932 | Collins ........................ | 239/654 |
| 3,481,512 A | * | 12/1969 | Scheffer et al. ............. | 222/413 |
| 4,207,995 A | | 6/1980 | Neely ......................... | 222/231 |
| 4,718,579 A | | 1/1988 | Brody et al. .............. | 222/129.4 |
| 5,918,768 A | | 7/1999 | Ford ........................... | 222/113 |
| 5,927,553 A | * | 7/1999 | Ford ........................ | 222/129.4 |
| 6,419,120 B1 | * | 7/2002 | Bertone ................... | 222/129.4 |

FOREIGN PATENT DOCUMENTS

CA      2313794      1/2002

* cited by examiner

*Primary Examiner*—Gene Mancene
*Assistant Examiner*—Melvin A. Cartagena
(74) *Attorney, Agent, or Firm*—Winston & Strawn LLP

(57) ABSTRACT

The invention relates to a dispensing canister that improves dosing consistency and powder evacuation, particularly when dry powdered beverage-forming or food-forming material having poor intrinsic flowing properties are to be dispensed. The canister includes a reservoir having two terminal walls and two side walls, a rotatable volumetric dosing device longitudinally extending in the reservoir, and a main agitating wheel arranged to gear on the rotatable volumetric dosing device to rotate in the reservoir upon actuation of the rotatable dosing device. The secondary agitating wheel is arranged to gear on the main agitating wheel and the two wheels are vertically offset so that the main wheel is arranged to act in a downward rotation closer to a first terminal wall whereas the secondary wheel is arranged to act in a downward rotation closer to the second terminal wall.

15 Claims, 5 Drawing Sheets

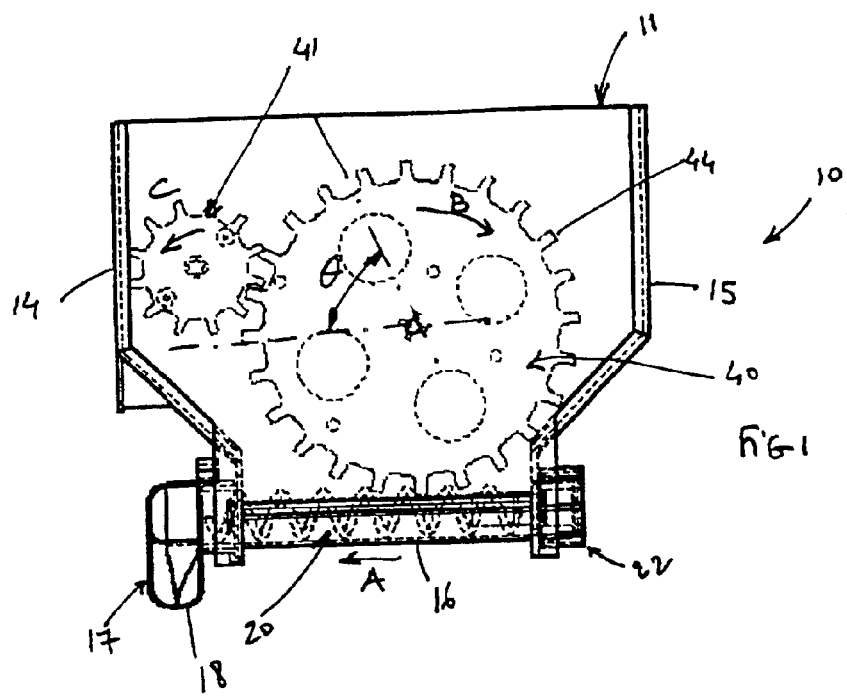
FIG. 1
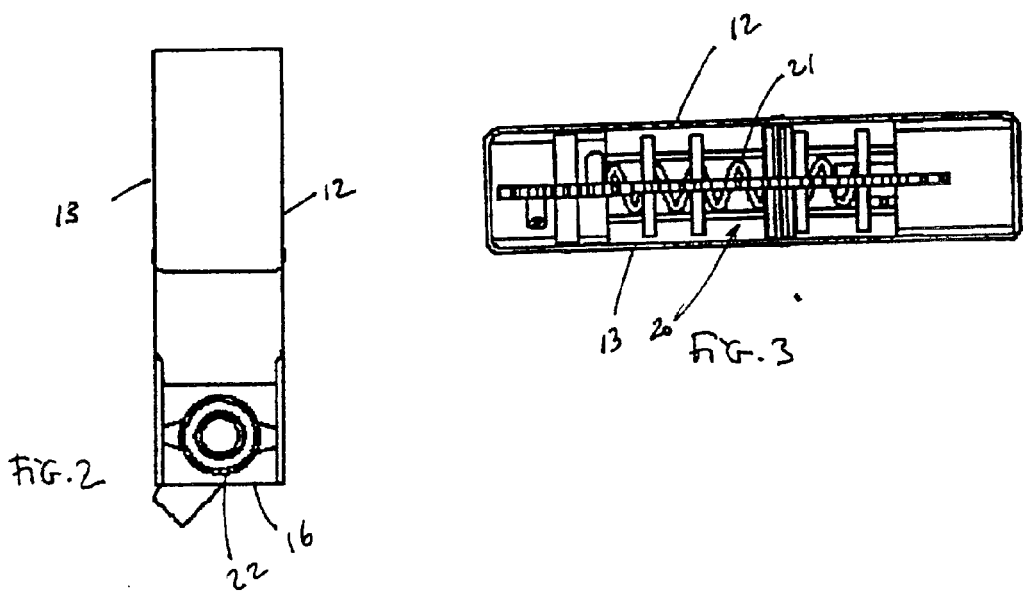
FIG. 2
FIG. 3

DISPENSING CANISTER

FIELD OF THE INVENTION

The invention relates to improvements in dosing of a powder from a canister, in particular, for the use in food-service dispensing equipment. The canister of the invention may, for example, be used to dispense in a more consistent manner metered quantities of dry powdered food material having poor intrinsic flowing properties.

BACKGROUND OF THE INVENTION

Various automated beverages or food dispensers for making hot or cold reconstituted products are known in the art. In a conventional beverage or food dispenser, a metered amount of water-soluble beverage-forming or food-forming powder supplied from a storage canister, and a complementary metered amount of hot or cold water supplied from a water source are mixed to produce a final product, which is dispensed into a cup or glass.

Cohesive and hygroscopic powders, such as milk powders, gravy and the like and containing fat and/or humectant ingredients, are difficult to dispense out of a beverage or food canister in a consistent manner and are difficult to fully evacuate from the canister. In particular, cohesive powders do not flow well due to compaction and/or decompaction of the powder, lumping, cliffing and bridging inside the canister.

There are mainly two identified issues with dispensing these powders in the traditional canisters.

The first issue relates to the consistency of powder dosing that more particularly refers to the dose-to-dose variation. Typically, the gram-throw of powder dramatically decreases after a certain number of throws and the reconstituted beverage or food becomes more diluted. In terms of product quality, the consistency of the product is important for meeting the satisfaction of the consumer. If the dose-to-dose variation is too large, e.g., on the order of 5% of powder discrepancy or more, it effects the in-cup quality of the product in a way that becomes perceptible for the consumer.

The second issue relates to the powder evacuation out of the canister which may be incomplete or consistent within a predetermined tolerance. In short, the canister is unable to empty up to a certain point and a significant amount of powder remains. In traditional canisters, powder evacuation includes doses or gram-throws that are below the target throw as well as powder that remains in the canister after the dosing mechanism cannot further deliver powder. In terms of autonomy, low powder evacuation requires the canister to be more frequently filled by the operator, in order for the beverage not to become unacceptably weak when the powder level becomes low. Therefore, such low performing canisters may impact product quality and may require more attention from the operator in re-filling and maintenance of the device.

Current systems typically consist of a single rotary wheel and a breaking mechanism such as wire tapers or springs attached to the wheel. Typical canisters are described in U.S. Pat. Nos. 3,013,701 and 4,207,995.

Dosing is usually performed by an auger, either a spring or screw auger. The dosing end of the canister contains an exit that directs the powder towards the mixing area as it exits. These systems are effective when the powders to be dosed have moderate to good flow properties, but this effectiveness decreases when a poor-flowing, cohesive powder is used.

Therefore, there is a need for an improved dispensing canister that provides a better powder dosing consistency and a more complete and reliable powder evacuation than the known canisters of the art, in particular, when using moderate or bad flowing powders. The present invention now provides such a canister.

SUMMARY OF THE INVENTION

The dispensing canister of the invention comprises a reservoir having two terminal walls, a rotatable volumetric dosing means longitudinally extending in the reservoir between the terminal walls, a main agitating wheel operatively associated with the rotatable volumetric dosing means to rotate in the reservoir upon actuation of the rotatable volumetric dosing means, and a secondary agitating wheel operatively associated with the main agitating wheel, wherein the wheels are vertically offset so that the main wheel is positioned closer to one terminal wall and is arranged to act in a downward rotation closer to that wall with the secondary wheel being positioned closer to the other terminal wall and being arranged to act in a downward rotation closer to that wall.

The reservoir generally includes two side walls, while the terminal walls includes a front wall and a rear wall. Usually, the dosing means is arranged in the bottom of the reservoir between the two terminal walls. A main agitating wheel is arranged to gear on the rotatable volumetric dosing means so as to rotate in the reservoir upon actuation of the rotatable dosing means. The invention is mainly based on the principle that a secondary agitating wheel is arranged to gear on the main agitating wheel. More preferably, the main agitating wheel is arranged to act in a downward rotation closer to a first terminal wall whereas the secondary wheel is arranged to act in a downward rotation closer to the second terminal wall. Therefore, the two wheels are vertically offset one another and are arranged in rotation in such a manner that they promote a downward pushing effect of the powder along the terminal walls. As a result, the powdered material tends to become loosened along the terminal walls of the canister and powder structures are unable to settle in these areas.

In a preferred embodiment, the rotatable volumetric dosing means is a screw auger or, alternatively, a spring auger and the auger is arranged to transport a volume of powder that varies as a function of the longitudinal position along the dosing means. It has been surprisingly found that remarkable results on dosing consistency and evacuation could be successfully obtained if the auger had a variable volumetric configuration used in combination with the aforementioned two-wheel offset configuration that promotes the downward pushing effect along the walls.

In a possible embodiment, the auger may be arranged to comprise a volume of transport for the powder that is greater in the rear portion of the auger than in the front portion of the auger. For that, the auger may be an helicoidal spring auger with a solid insert placed within the spring in a front part of the auger. A solid insert reduces the volume available for moving the powder forward in the front region of the canister whereas more powder is moved from the rear region of the canister. As the volume reduces in the front, the powder tends to compact in a lower available volume near the outlet thereby maintaining the powder density and minimizing the dosing variations.

In another embodiment, the auger may be arranged to comprise a volume of transport that is greater in the front portion of the auger than in the rear portion of the auger. For that, the auger may be an helicoidal spring auger with a solid insert placed within the spring in rear part of the auger, thus reducing the capacity of the auger to move the powder in the rear region as opposed to the front region of the canister and thereby reducing cliffing at the front terminal end.

The invention also relates to a method for dispensing a beverage-forming or food-forming powder from a dispensing device having a reservoir and a rotatable volumetric dosing means longitudinally extending in the reservoir between terminal walls. The method comprises providing agitation on the terminal walls of the reservoir when the dosing means is rotated so as to enhance gram throw performance or dosing time of the dispensing device. By this method, dosing time can be increased by at least 20 to 40% or the number of throws can be increased by at least about 50 to 66%.

BRIEF DESCRIPTION OF THE DRAWINGS

For a better understanding of the present invention, the description is accompanied by a set of drawings whose figures show the most significant details of the invention in an illustrative and non-limiting manner, and wherein.

DETAILED DESCRIPTION OF THE PREFERRED EMBODIMENTS

Figure 4:
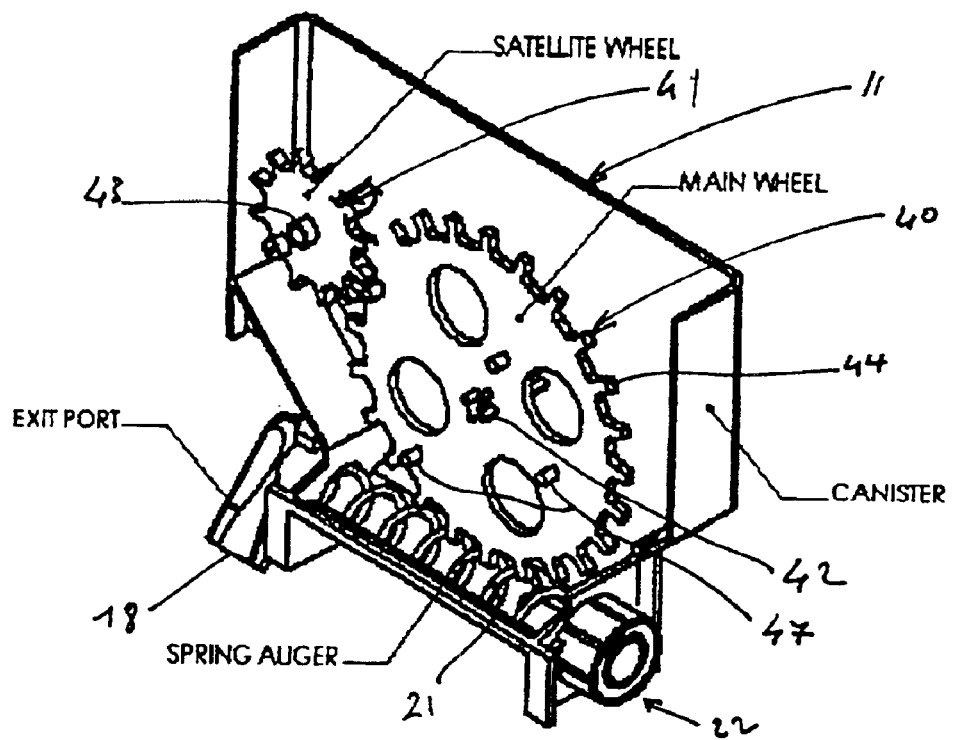
FIG. 4 is a perspective view with a side wall removed to show the inside of the canister.

Referring to FIGS. 1 to 4, the dispensing canister of the invention 10 includes an upright reservoir 11 having oppositely disposed sidewalls 12,13 and oppositely disposed terminal walls, respectively a front wall 14 and a rear wall 15. The sidewalls and terminal walls are interconnected to one another and preferably are injection molded from a polymeric plastic material integral with a bottom wall 16. The terminal walls 14, 15 may preferably comprise a substantially vertical portion followed by progressively downward tapered portions.

Within the reservoir 11, there is provided a volumetric dosing means 20. The volumetric dosing means advantageously comprises a spring auger 21 as shown or, alternatively, a screw auger. The volumetric dosing means 20 extends for substantially the entire length of the reservoir at the lower end thereof adjacent the bottom wall 16. The rear end of the auger 21 is rotatably supported by an aperture of the rear wall 15 and terminates by a connector 22. The connector 22 is intended to be linked to a shaft of a conventional electrical actuating system such as a DC motor of the dispensing device (not shown). At the opposite end of the auger, i.e., the front end, the terminal wall 14 is provided with an opening 16 to which is mounted a chute 17. The chute 17 is secured to the front wall in any convenient manner such as by tight fitting engagement, screwing, riveting, adhesion and combinations thereof. The chute 17 channels the powder from the auger to a discharge port 18 arranged in a selected direction, usually for guiding the powder toward a mixing bowl or a dispensing line.

According to an important aspect of the invention, a main agitating wheel 40 and a secondary agitating wheel 41 are both provided within the reservoir 11 and supported by the sidewalls 12, 13 along respective transversal rotation axles or hubs 42, 43 on each side that engage bearings of the sidewalls. When properly installed, the wheels are substantially parallel and equally spaced from the sidewalls 12, 13.

The main agitating wheel 40 is geared to the dosing means, more specifically to the auger, so that as the auger rotates to move power forward in direction A, the agitating wheel rotates in rotational direction B. As generally known, a gear configuration of wheel and auger can be constructed at the periphery of the wheel, by a plurality of teeth 44 circumferentially and evenly disposed therearound.

The main agitating wheel must be of a size sufficient to provide an effective agitation along the height of the reservoir while still being able to properly engage the auger.

The secondary agitating wheel or satellite wheel 41 is provided to be driven by the main agitating wheel so that it rotates in a reverse direction C. Both first and second wheels 40, 41 are therefore arranged within the reservoir in a manner that promotes downward motion of the powder in the region adjacent the terminal walls 14, 15. For that, the axis of the wheels are vertically offset and the main wheel is preferably positioned closer to the rear wall 15 whereas the secondary wheel is positioned closer to the front wall 14. The wheels may not necessarily be horizontally aligned along their axis. In a preferred aspect, the axis of the secondary wheel may be positioned within an arc portion θ of between 270 degrees and 350 degrees, and more preferably between 280 and 310 degrees. The dimensions of the wheels may preferably be determined to provide an optimized occupation of the internal volume of the reservoir while not physically abutting against the terminal walls.

The size of the secondary wheel 41 is not critical but may encompass a wide range of diameters depending upon the length of the vertical portions and the specific tapered geometry of the canister. Typically, the diameter of the secondary wheel may be of from about 0.05 to 1.0 time, preferably 0.1 to 0.6 time, the diameter of the main wheel. In another embodiment, more than one secondary wheel of smaller size may be provided, horizontally offset from one another with each one directly geared onto the main wheel. One result of this multi-wheel configuration is that there is less a tendency for local accumulation, cliffing or bridging along the terminal ends of the canister since the powder is constantly pushed down toward the longitudinally oriented dosing device.

In an even more preferred aspect of the invention, the multi-wheel configuration is combined with a dosing device that comprises an auger arranged to transport a volume of powder that varies as a function of the longitudinal position along the dosing means. Depending on the type of powder used, the modifications to the auger may be such that the volume of powder transported or delivered at the outlet is reduced or, alternatively, such that the volume of powder transported at the rear of the canister is reduced.

Figure 5:
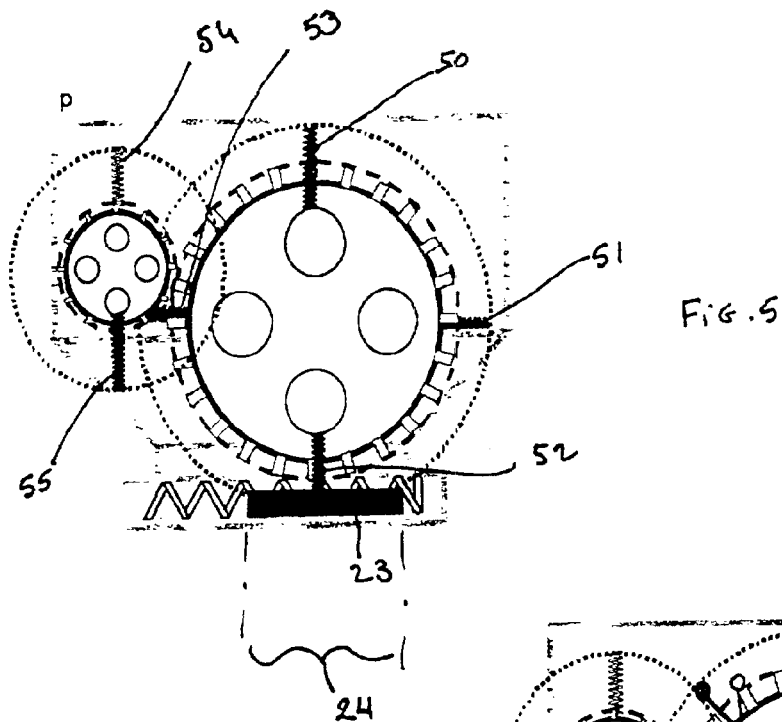
FIG. 5 is a side view similar to FIG. 1 but for a second embodiment.

More specifically, in a first embodiment shown in FIG. 5, the auger is arranged to comprise a transport volume for the powder that is lower in the rear portion of the auger than in the front portion of the auger. The volume can increase on a progressive or stepped basis. In case the auger is an helicoidal spring, a solid insert 23 may, for example, be located within the screw in a rear portion 24 of the auger. Hence, the solid insert creates a reduction of the capacity of the auger to transport powder in this area as compared to the front area. It has surprisingly been found that such a configuration is primarily effective for improving the dosing consistency of powder of average cohesiveness such as for agglomerated milk powder and the like. One reason for this is due to the powder moving downward more uniformly. The state of the powder, especially its compaction and the effective bulk density at the point where it feeds into the auger, becomes more consistent for cohesive powders. Hence, the powder density in the exit opening varies less and the volume based dosing leads to a more consistent mass.

Figure 6:
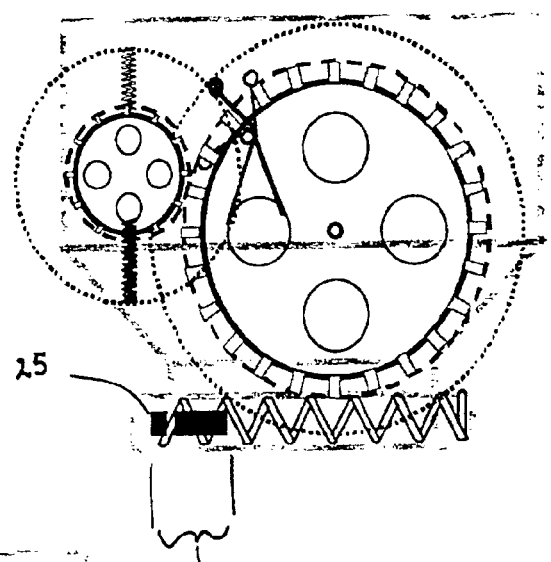
FIG. 6 is a side view similar to FIG. 1 but for a third embodiment.

In a second embodiment shown in FIG. 6, in particular for very cohesive powder types such as non agglomerated milk powder, mix or dehydrated fat based culinary products, superior results have surprisingly been obtained when the auger is arranged with a volume of transport for the powder that is lower in the front portion of the auger than in the rear portion of the auger. For instance, for a spring type auger, a solid insert 25 may be located within the screw in a front portion 26 of the auger. The insert does not need to longer than a few centimeters, and in general is about 10 to 30% of the auger length. The front portion of the auger can be considered as a portion situated in the vicinity of the outlet. The lower volume left in the front of the dosing device tends to compact the powder near the outlet, thus eliminating the presence of holes and maintaining the powder mass sufficiently dense in this area. As a result, very cohesive powders can be uniformly dispensed in that the dose-to-dose variation for such powders can be effectively reduced.

Figure 7:
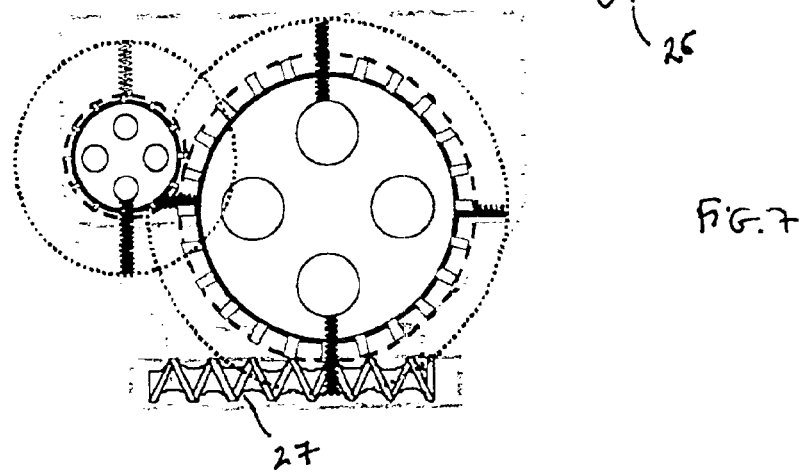
FIG. 7 is a side view similar to FIG. 1 but for a fourth embodiment.

In a third embodiment as shown in FIG. 7, the auger may be an endless screw 27 made of a longitudinal pipe and an helicoidal thread mounted around the pipe. In one embodiment, the volume of transport may be made constant. In a variant, the volume of transport may be made variable by different means such as by a variation of the diameter of the pipe as a function of its length or by a variation of the pitch of the thread or a combination thereof. For example, if the powder has a high level of cohesiveness, the screw will preferably have a greater diameter in the front than in the rear. On the contrary, if the powder has a lower cohesiveness, it will be preferable to have a screw with a higher diameter in the rear than in the front.

As common to all embodiments, it is preferred to include at least one breaking extension that can extend radially from the main wheel and at least one breaking extension that can extend radially from the secondary wheel. As shown in FIG. 5, those breaking extensions may, for instance, be formed of pairs of long wire springs 50–55 that scrape onto the inner surfaces of the terminal walls upon rotation of the wheels downwards. The springs can be attached to each side of the wheels to protrusions 47 as best shown in FIG. 4. The helicoidal springs may be replaced by any equivalent breaking elements such as a resilient plastic or rubber tube, whisker or wire. The action of the breaking extensions on the wheels also contributes to increase the powder density by compacting on the downstroke in direction to the dosing system, thus, reducing the areas of lower density and improving the dosing consistency.

EXAMPLES

Drawing FIGS. 8–11 illustrate the gram throw performance of various canisters according to the prior art and the invention.

Figure 8:
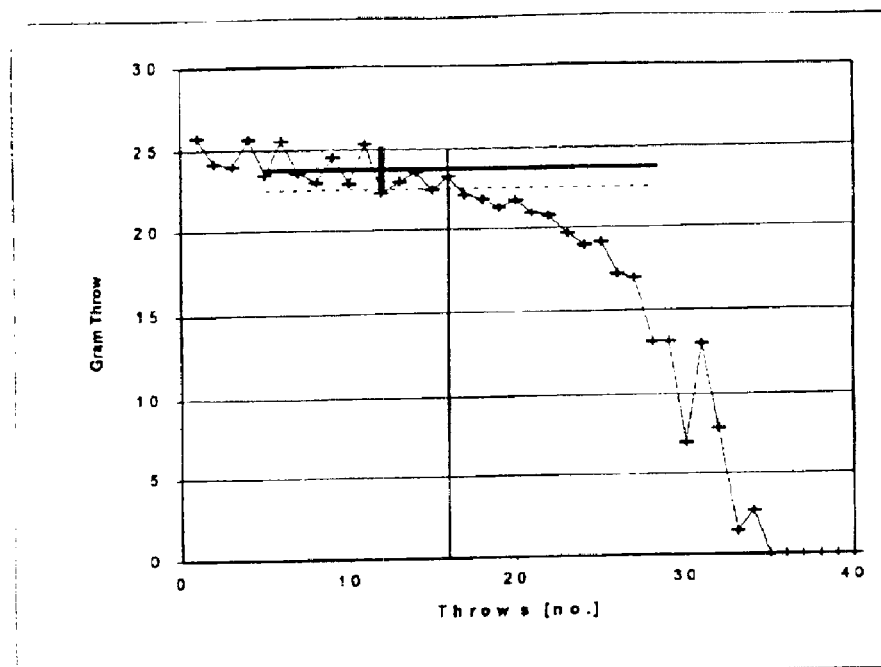
FIG. 8 is the gram throw variation as a function of the number of throws during dispensing of a traditional canister with a single agitating wheel.

FIG. 8 displays the gram-throw performance of a traditional canister ("Rhea Lioness" like canister) with a single wheel using a cappuccino dry mix and an exit area of about 300 mm$^2$. The total evacuation of the reservoir is of only 51% by weight and the standard deviation is of about 4.2% by weight. The standard deviation is a measure of total measurement deviation from the average. It can also be defined as an estimate of average uncertainty of the measurements and is expressed in this case in percentage average. As it can be observed from the graph, the gram-throw (in grams) gradually decreases to an unacceptable level after about less than 17 throws, so as the canister empties, the product prepared from the machine becomes more and more diluted and less desirable to consumers.

Figure 9:
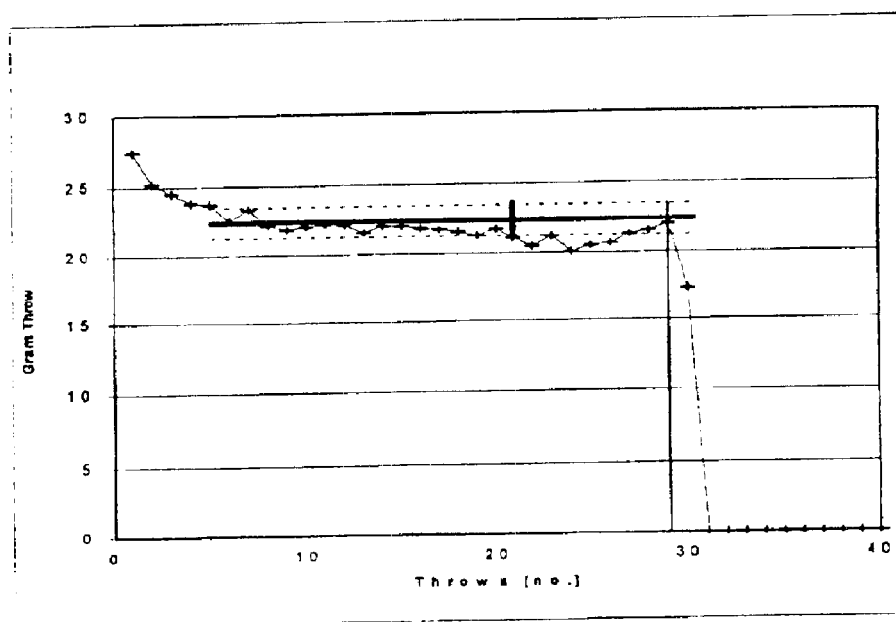
FIG. 9 is the gram throw variation as a function of the number of throws during dispensing of the canister of FIG. 5.

FIG. 9 displays the gram-throw performance a canister according to the invention that includes a main wheel and a satellite wheel for the specific embodiment of FIG. 5 (rear insert within spring auger). The total evacuation is of about 76% by weight and the standard deviation of about 3.4% by weight. There is no gradual decline in gram-throw at the end of the test so that products made near the depletion of the canister are of the same quality as those made when the canister is full. Also, the dosing time is about 40% longer than that of the traditional canister.

Figure 10:
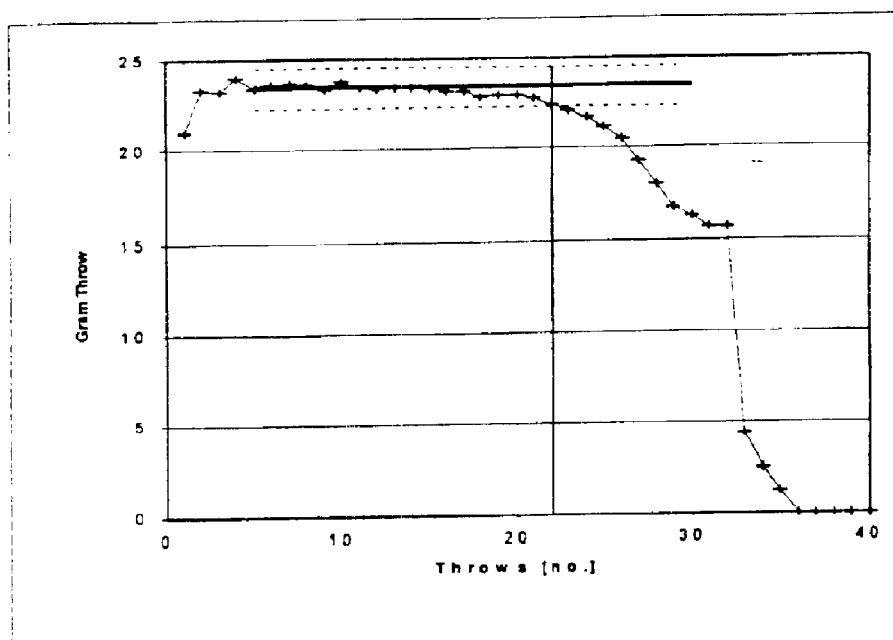
FIG. 10 is a curve similar to FIG. 9 but according to the embodiment of FIG. 6.

FIG. 10 displays for the gram-throw performance for the embodiment of FIG. 6 (front insert within spring auger). The total evacuation is about 82% by weight and the standard deviation is only about 1.3%. There is a gradual decline of gram-throw at the end of the evacuation cycle, but this occurs only after about 30 throws, an increase of over 75% compared to that of the traditional canister. Furthermore, the dosing time is about 120% longer than that of the traditional canister.

Figure 11:
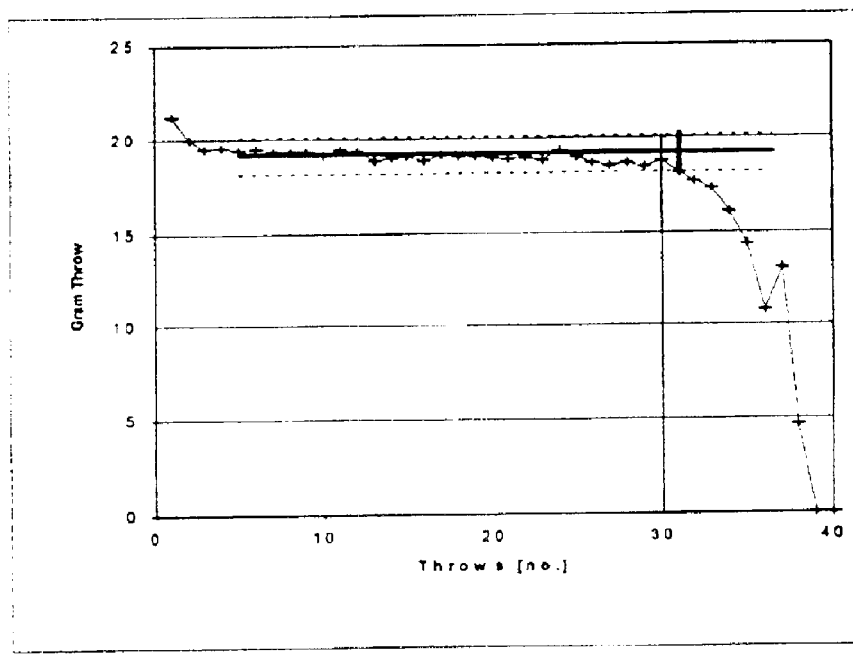
FIG. 11 is a curve similar to FIG. 9 but according to the embodiment of FIG. 7.
Figure 1:
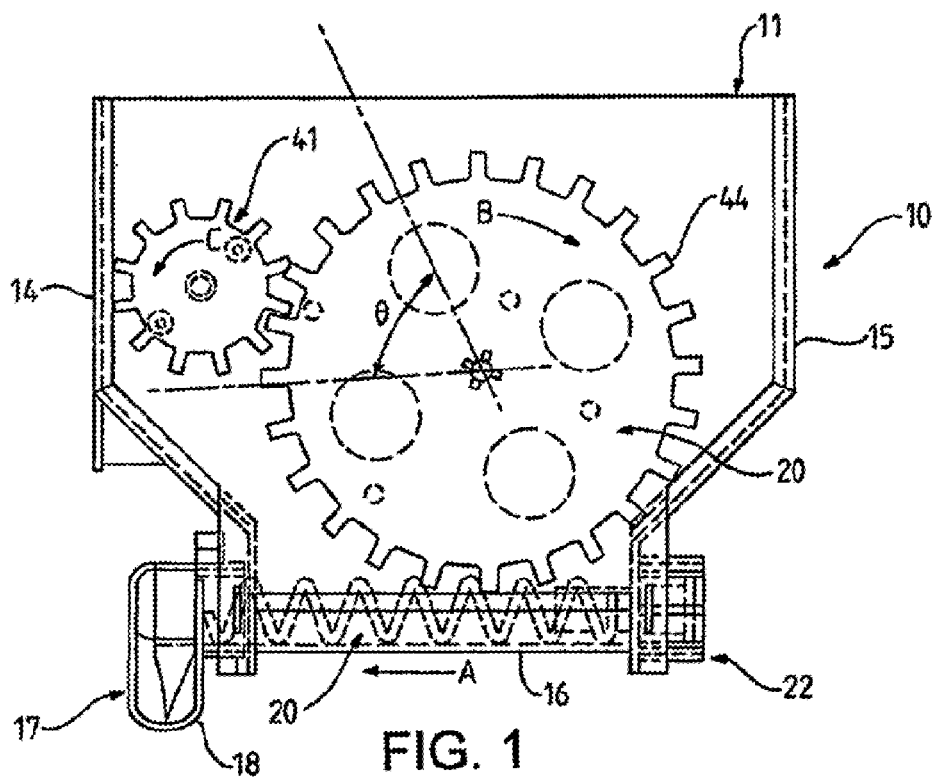
FIG. 1 illustrates a side view of a first embodiment of the canister of the invention with internal parts shown in dotted lines.
Figure 2:
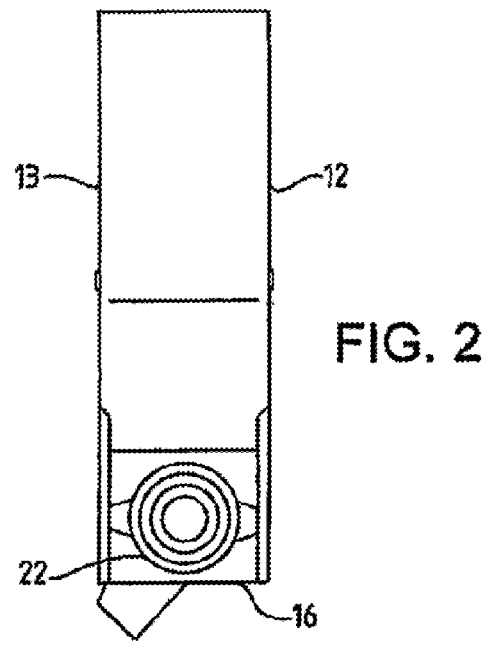
FIG. 2 illustrate a rear view of the canister of FIG. 1.
Figure 3:
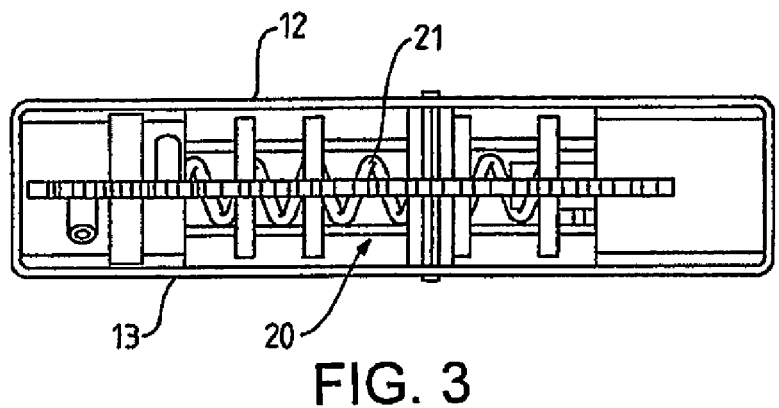
FIG. 3 is a top view of the canister of FIG. 1.
Figure 4:
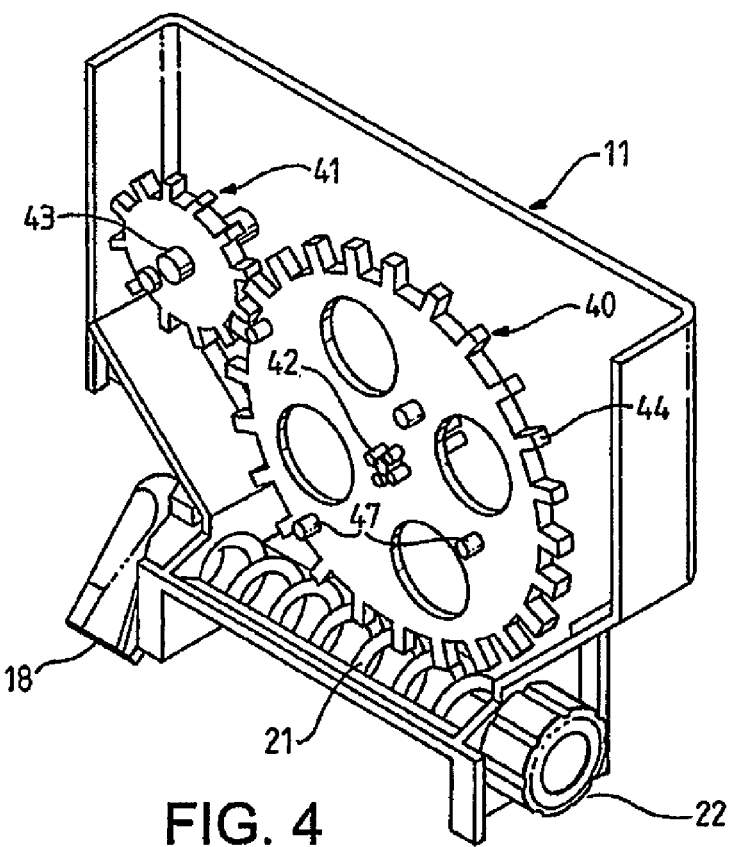
Figure 5:
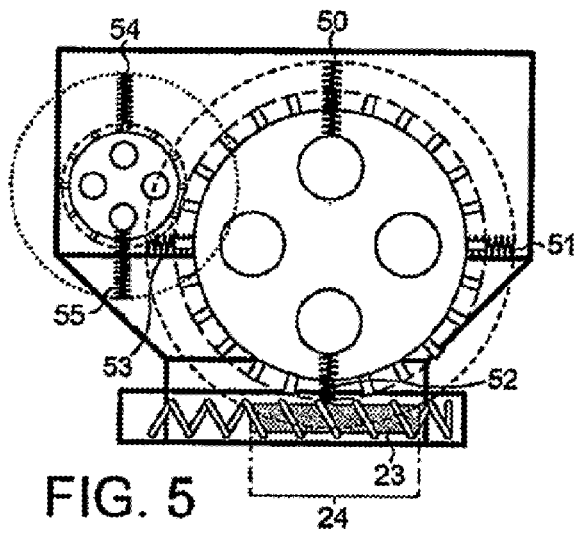
Figure 6:
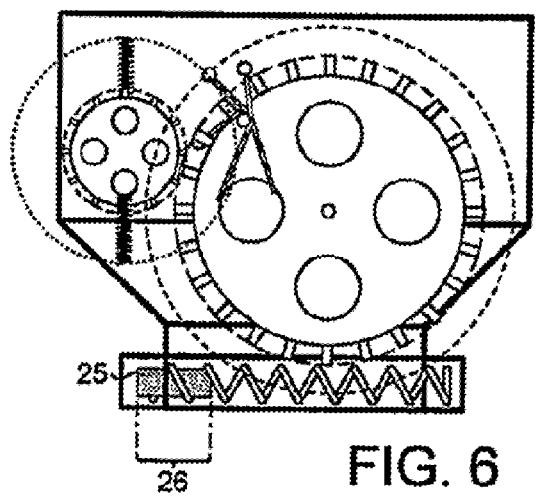
Figure 7:
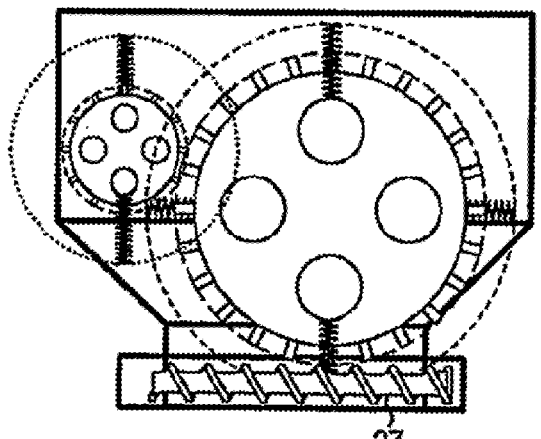
Figure 8:
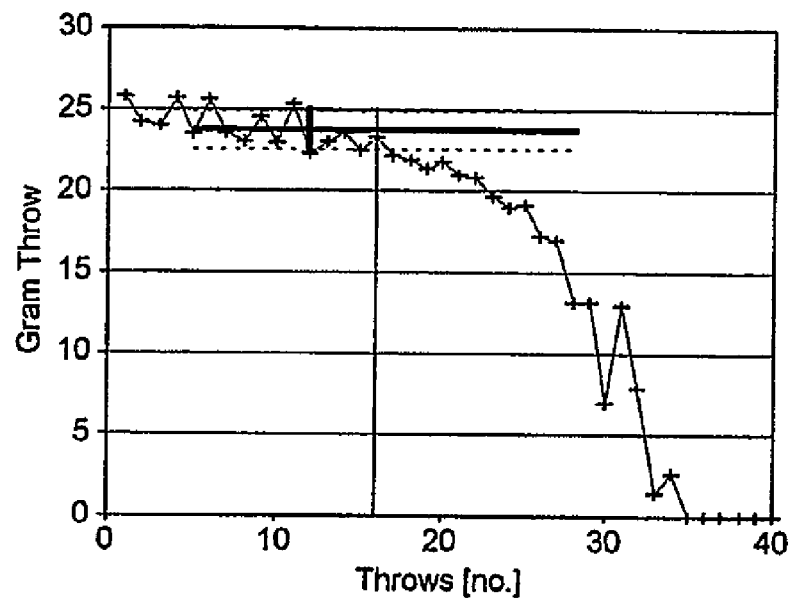
Figure 9:
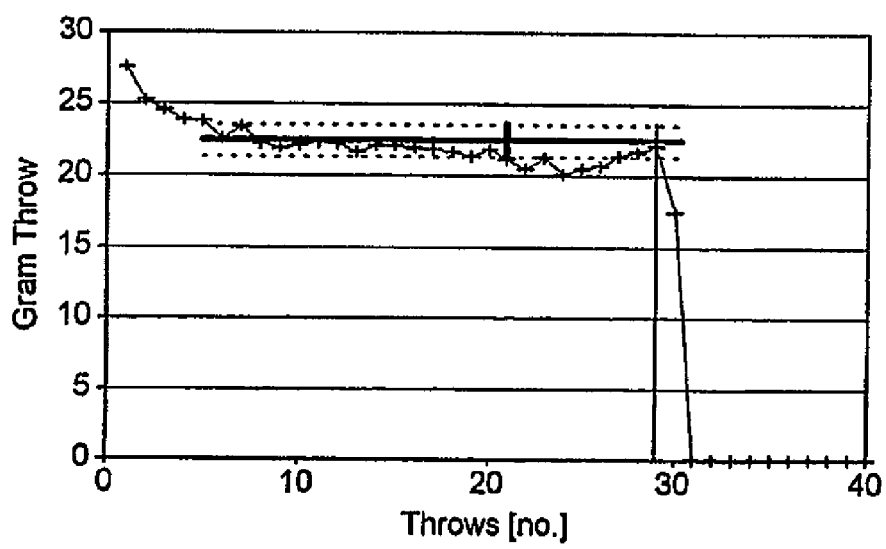
Figure 10:
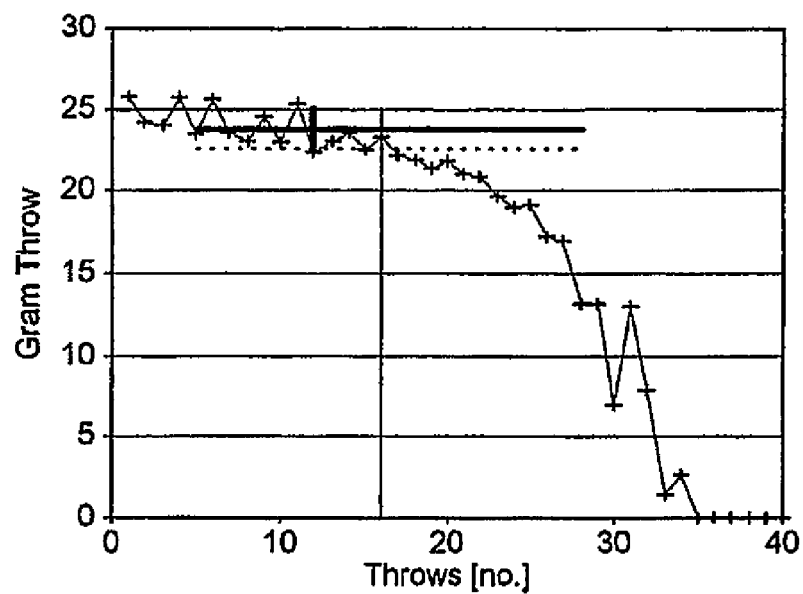
Figure 11:
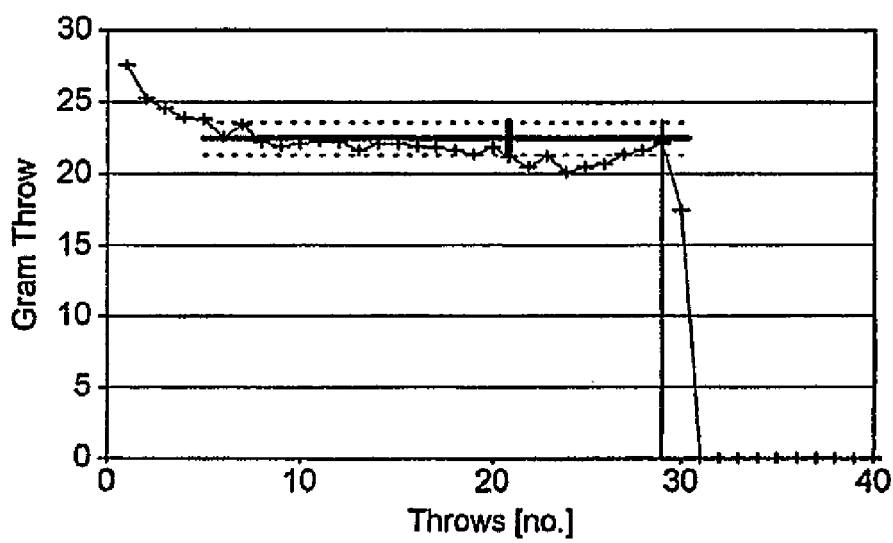

FIG. 11 displays the gram-throw performance for the embodiment of the invention that is shown in FIG. 7. The auger is an helicoidal screw of constant feed rate. The evacuation is of about 73% by weight and the standard deviation is only about 1.3%. The dosing time has been improved by about 20% compared to the traditional canister.

While illustrative embodiments of the invention are disclosed herein, it will be appreciated that numerous modifications and other embodiments may be devised by those skilled in the art. For example, the wheels may be of various other types, shapes or constructions that may also be appropriate for the intended result provided they are capable of gearing on the auger or to one another.

What is claimed is:

1. A dispensing canister comprising:

a reservoir having two terminal walls and one or more side wall(s), a rotatable volumetric dosing means longitudinally extending in the reservoir between the terminal walls, a main agitating wheel operatively associated with the rotatable volumetric dosing means to rotate in the reservoir upon actuation of the rotatable volumetric dosing means to assist in dispensing material in the reservoir, and a secondary agitating wheel operatively associated with the main agitating wheel to further assist in dispensing material in the reservoir, wherein the wheels are vertically offset so that the main wheel is positioned closer to one terminal wall and is arranged to act in a downward rotation with the secondary wheel being positioned closer to the other terminal wall and being arranged to act in a downward rotation closer to that wall to provide a downward force and pushing effect on the material alone the terminal walls.

2. The device according to claim 1, wherein the reservoir includes two side walls, the main agitating wheel is geared to the dosing means and the secondary agitating wheel is geared to the main agitating wheel for rotation in a direction that is opposite to that of the main agitating wheel.

3. The dispensing canister according to claim 1, wherein the main wheel comprises at least one breaking extension that extends radially to scrape on the surface of the wall as the wheel rotates.

4. The dispensing canister according to claim 3, wherein the secondary wheel comprises at least one breaking extension that extends radially to scrape on the surface of the opposite wall as the wheel rotates.

5. The dispensing canister according to claim 1, wherein the rotatable volumetric dosing means is a screw auger or a spring auger and is used to dispense a beverage-forming or food-forming powder that is supplied to the reservoir.

6. The dispensing canister according to claim 5, wherein the auger is configured and arranged to provide a volume of transport of powder that varies as a function of the longitudinal position along the auger.

7. The dispensing canister according to claim 5, wherein the auger is configured and arranged to provide a volume of transport for the powder that is lower in a front portion of the auger than in a rear portion of the auger.

8. The dispensing canister according to claim 7, wherein the auger is a spring with a solid insert located within the screw in a front portion of the auger.

9. The dispensing canister according to claim 5, wherein the auger is configured and arranged to provide a volume of transport for the powder that is lower in a rear portion of the auger than in a front portion of the auger.

10. The dispensing canister according to claim 9, wherein the auger is a spring with a solid insert located within the screw in a rear portion of the auger.

11. A dispensing canister comprising:

a reservoir having first and second terminal walls and two side walls, a beverage-forming or food-forming powder supplied to the reservoir, a rotatable volumetric dosing auger longitudinally extending in the reservoir between the terminal walls, a main agitating wheel positioned closer to the first terminal wall and arranged to act in a downward rotation, the wheel being geared to the dosing auger to rotate in the reservoir upon actuation of the dosing auger and including at least one breaking extension that extends radially to scrape on the surface of the terminal wall as the wheel rotates downward, and a secondary agitating wheel positioned closer to the second terminal wall and arranged to act in a downward rotation, the wheel being geared to the main agitating wheel for rotation in a direction that is opposite to that of the main agitating wheel and including at least one breaking extension that extends radially to scrape on the surface of the terminal wall as the wheel rotates downwardly, wherein the wheels are offset vertically from each other and are arranged in rotation in such a manner that they provide a downward force and pushing effect on the powder along the terminal walls.

12. The dispensing canister according to claim 11, wherein the rotatable volumetric dosing auger is a screw auger or a spring auger and the auger is configured and arranged to provide a volume of transport of powder that varies as a function of the longitudinal position along the auger.

13. A method for dispensing a beverage-forming or food-forming powder from a dispensing device comprising:

a reservoir having two terminal walls and one or more side wall(s), a rotatable volumetric dosing means longitudinally extending in the reservoir between the terminal walls, a main agitating wheel operatively associated with the rotatable volumetric dosing means to rotate in the reservoir upon actuation of the rotatable volumetric dosing means to assist in dispensing material in the reservoir, and a secondary agitating wheel operatively associated with the main agitating wheel to further assist in dispensing material in the reservoir, wherein the wheels are vertically offset so that the main wheel is positioned closer to one terminal wall and is arranged to act in a downward rotation with the secondary wheel being positioned closer to the other terminal wall and being arranged to act in a downward rotation closer to that wall to provide a downward force and pushing effect on the material along the terminal walls, which method comprises providing agitation on the terminal walls of the reservoir when the dosing means is rotated so as to enhance gram throw performance or dosing time of the dispensing device.

14. The method of claim 13, wherein the dosing time is increased by at least 20% or the number of throws is increased by at least about 50%.

15. The method of claim 13, wherein the dosing time is increased by at least 40% or the number of throws is increased by at least about 66%.

* * * * *

UNITED STATES PATENT AND TRADEMARK OFFICE
CERTIFICATE OF CORRECTION

PATENT NO. : 6,834,779 B2
APPLICATION NO. : 10/183861
DATED : December 28, 2004
INVENTOR(S) : Ufheil et al.

It is certified that error appears in the above-identified patent and that said Letters Patent is hereby corrected as shown below:

<u>Title Page</u>:
Replace the Title Page with the attached:

<u>Drawings</u>:
Replace Figs. 1-11 with the following figures: as attached

<u>Column 7</u>:
Line 10, after "and pushing effect on the material", delete "alone" and insert -- along --.

Signed and Sealed this

Twentieth Day of March, 2007

JON W. DUDAS
*Director of the United States Patent and Trademark Office*

United States Patent
Ufheil et al.

(10) Patent No.: US 6,834,779 B2
(45) Date of Patent: Dec. 28, 2004

(54) DISPENSING CANISTER

(75) Inventors: Gerhard Ufheil, New Milford, CT (US); Juan J. Gonzalez, New Milford, CT (US); Francesco Chiarella, Hyde Park, NY (US); Constance L. Whipple, New Milford, CT (US); Dinakar Panyam, New Milford, CT (US)

(73) Assignee: Nestec S.A., Vevey (CH)

(*) Notice: Subject to any disclaimer, the term of this patent is extended or adjusted under 35 U.S.C. 154(b) by 312 days.

(21) Appl. No.: 10/183,861

(22) Filed: Jun. 25, 2002

(65) Prior Publication Data
US 2003/0234261 A1 Dec. 25, 2003

(51) Int. Cl.$^7$ ................................. G01F 11/000
(52) U.S. Cl. ............................. 222/232; 222/413; 222/1
(58) Field of Search .................. 222/198, 220, 222/201, 227, 202, 413, 232, 236–241, 231

(56) References Cited

U.S. PATENT DOCUMENTS

| | | | |
|---|---|---|---|
| 1,872,028 A | * 8/1932 | Collins | 239/654 |
| 3,481,512 A | * 12/1969 | Scheffer et al. | 222/413 |
| 4,207,995 A | 6/1980 | Neely | 222/231 |
| 4,718,579 A | 1/1988 | Brody et al. | 222/129.4 |
| 5,918,768 A | 7/1999 | Ford | 222/113 |
| 5,927,553 A | * 7/1999 | Ford | 222/129.4 |
| 6,419,120 B1 | * 7/2002 | Bartone | 222/129.4 |

FOREIGN PATENT DOCUMENTS

CA 2313794 1/2002

* cited by examiner

*Primary Examiner*—Gene Mancene
*Assistant Examiner*—Melvin A. Cartagena
(74) *Attorney, Agent, or Firm*—Winston & Strawn LLP

(57) ABSTRACT

The invention relates to a dispensing canister that improves dosing consistency and powder evacuation, particularly when dry powdered beverage-forming or food-forming material having poor intrinsic flowing properties are to be dispensed. The canister includes a reservoir having two terminal walls and two side walls, a rotatable volumetric dosing device longitudinally extending in the reservoir, and a main agitating wheel arranged to gear on the rotatable volumetric dosing device to rotate in the reservoir upon actuation of the rotatable dosing device. The secondary agitating wheel is arranged to gear on the main agitating wheel and the two wheels are vertically offset so that the main wheel is arranged to act in a downward rotation closer to a first terminal wall whereas the secondary wheel is arranged to act in a downward rotation closer to the second terminal wall.

15 Claims, 5 Drawing Sheets

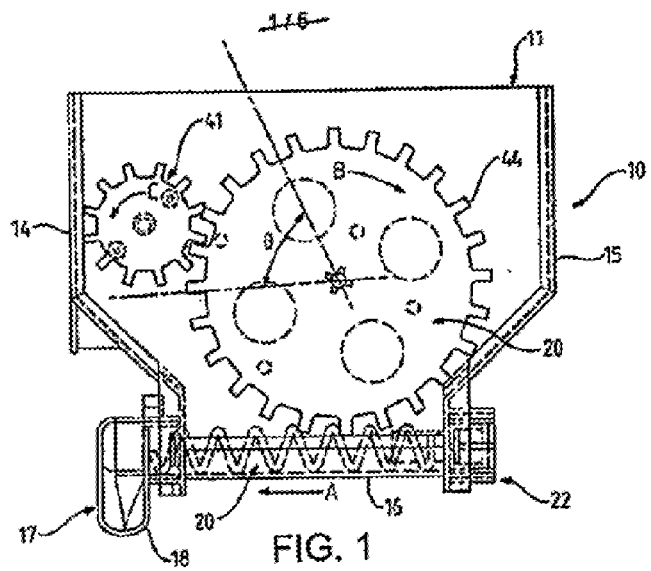

FIG. 1